United States Patent
Wang et al.

(10) Patent No.: US 11,395,068 B2
(45) Date of Patent: Jul. 19, 2022

(54) METHOD FOR AUDIO RECORDING AND CONVERSION OF SMART HEADSET

(71) Applicant: Hefei STAROT Infotech Co., Ltd., Anhui (CN)

(72) Inventors: Danny Wang, Hefei (CN); Andy Chen, Hefei (CN); Xiansheng Ma, Hefei (CN)

(73) Assignee: HEFEI STAROT INFOTECH CO., LTD., Anhui (CN)

( * ) Notice: Subject to any disclaimer, the term of this patent is extended or adjusted under 35 U.S.C. 154(b) by 0 days.

(21) Appl. No.: 17/343,147

(22) Filed: Jun. 9, 2021

(65) Prior Publication Data

US 2022/0116710 A1  Apr. 14, 2022

(30) Foreign Application Priority Data

Oct. 12, 2020 (CN) .......................... 202011085559.0

(51) Int. Cl.
| | |
|---|---|
| *H04R 5/04* | (2006.01) |
| *H04W 4/80* | (2018.01) |
| *H04R 3/04* | (2006.01) |
| *H04R 5/033* | (2006.01) |
| *H04S 1/00* | (2006.01) |
| *H04S 7/00* | (2006.01) |
| *H04L 65/75* | (2022.01) |

(52) U.S. Cl.
CPC ............... *H04R 5/04* (2013.01); *H04L 65/75* (2022.05); *H04R 3/04* (2013.01); *H04R 5/033* (2013.01); *H04S 1/007* (2013.01); *H04S 7/307* (2013.01); *H04W 4/80* (2018.02); *H04R 2420/07* (2013.01)

(58) Field of Classification Search
CPC . H04R 5/04; H04R 3/04; H04R 5/033; H04R 2420/07; H04R 1/1091; H04R 5/00; H04L 65/75; H04L 1/16; H04L 1/1874; H04W 4/80; H04W 28/06; H04W 28/14; H04W 76/14; G10L 19/04; G10L 19/167; G10L 21/10; G06F 3/165; G11C 7/16; H04S 1/007; H04S 7/307
USPC .......................................... 381/74, 26, 309
See application file for complete search history.

(56) References Cited

U.S. PATENT DOCUMENTS

| | | | |
|---|---|---|---|
| 7,616,760 B2 * | 11/2009 | Trip .................... | H04M 1/6066 379/430 |
| 9,554,204 B2 * | 1/2017 | Souma ............. | H04N 21/44231 |

(Continued)

*Primary Examiner* — Xu Mei
(74) *Attorney, Agent, or Firm* — Cooper Legal Group LLC

(57) ABSTRACT

The present invention relates to audio recording, and in particular to a method for audio recording and conversion of smart headset. The smart headset establishes communication with the mobile terminal, and the mobile terminal sends an instruction to the smart headset to start recording. The smart headset splits audio data into two channels, wherein one is sent to the SPEAK end of the smart headset and played, the other is sent to the mobile terminal after being compressed and packaged. The smart headset uses its cache memory to cache the audio data packets, and determines whether it has received the confirmation signals from the mobile terminal within the response time limit. If the smart headset has received the confirmation signals from the mobile terminal within the response time limit, it will clear the corresponding audio data packets from the cache memory, otherwise re-send the audio data packet cached.

7 Claims, 1 Drawing Sheet

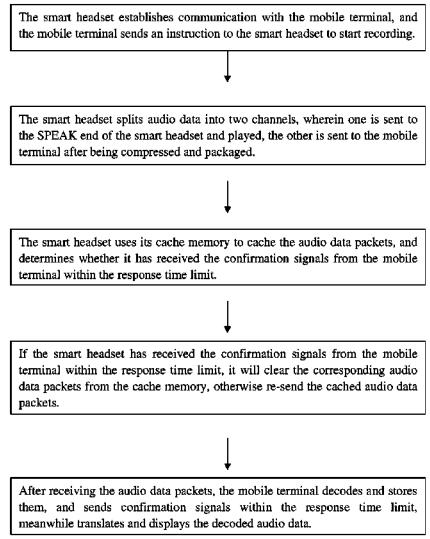

(56) References Cited

U.S. PATENT DOCUMENTS

| | | | |
|---|---|---|---|
| 10,231,056 B2* | 3/2019 | Poornachandran | H04R 5/04 |
| 10,410,634 B2* | 9/2019 | Masaki | H04R 1/1016 |
| 2003/0073460 A1* | 4/2003 | van Pelt | H04R 5/033 |
| | | | 455/556.1 |
| 2012/0257764 A1* | 10/2012 | Sung | H04R 1/1083 |
| | | | 381/74 |
| 2015/0326973 A1* | 11/2015 | Marrin | H04R 5/027 |
| | | | 381/309 |
| 2016/0057527 A1* | 2/2016 | Mattana | H04R 5/027 |
| | | | 381/74 |
| 2016/0299739 A1* | 10/2016 | Song | G06F 3/165 |

* cited by examiner

The smart headset establishes communication with the mobile terminal, and the mobile terminal sends an instruction to the smart headset to start recording.

The smart headset splits audio data into two channels, wherein one is sent to the SPEAK end of the smart headset and played, the other is sent to the mobile terminal after being compressed and packaged.

The smart headset uses its cache memory to cache the audio data packets, and determines whether it has received the confirmation signals from the mobile terminal within the response time limit.

If the smart headset has received the confirmation signals from the mobile terminal within the response time limit, it will clear the corresponding audio data packets from the cache memory, otherwise re-send the cached audio data packets.

After receiving the audio data packets, the mobile terminal decodes and stores them, and sends confirmation signals within the response time limit, meanwhile translates and displays the decoded audio data.

METHOD FOR AUDIO RECORDING AND CONVERSION OF SMART HEADSET

RELATED APPLICATIONS

The present application claims priority to Chinese Patent Application 202011085559.0, filed on Oct. 12, 2020, which relates to audio recording, and in particular to a method for audio recording and conversion of smart headset.

FIELD OF THE INVENTION

The present invention relates to audio recording, and in particular to a method for audio recording and conversion of smart headset.

BACKGROUND OF THE INVENTION

With the popularization and wide application of network teaching, more comprehensive contents need to be recorded during learning; participants need to record meeting or presentation content during audio conference or presentation; but inability to understand in time and deviations in understanding will occur due to the limitations of voice technology when people watch English video or listen to English audio on a daily basis. For high-frequency one-way audio in the above daily scenarios, the recording and voice-to-text conversion of one-way audio with a device can bring great convenience to users.

To meet the requirements of the above scenarios with the prior art, voice recorders or other mobile recording devices are generally used. These devices can be used for recording in the related scenarios but have high requirements for the scene. The use of a voice recorder requires a large enough volume for the loudspeaker of the device at the scene, which will cause noise pollution on the scene. What's worse, the recording will be seriously affected by surroundings or environment at the scene and the required content cannot be clearly recorded, which will have a great impact on the audio reproduction later, and deviations in the understanding of the audio content.

SUMMARY OF THE INVENTION

(i) Technical Problems Solved

In view of the above-mentioned disadvantages of the prior art, the present invention provides a method for audio recording and conversion of smart headset, which can effectively overcome the defects of the prior art regarding inability to clearly record one-way audio, poor real-time performance, and low integrity.

(ii) Technical Scheme

In order to achieve the above purposes, the present invention provides the following technical scheme:
A method for audio recording and conversion of smart headset comprises the following steps:
S1. The smart headset establishes communication with the mobile terminal, and the mobile terminal sends an instruction to the smart headset to start recording;
S2. The smart headset splits audio data into two channels, wherein one is sent to the SPEAK end of the smart headset and played, the other is sent to the mobile terminal after being compressed and packaged;
S3. The smart headset uses its cache memory to cache the audio data packets, and determines whether it has received the confirmation signals from the mobile terminal within the response time limit;
S4. If the smart headset has received the confirmation signals from the mobile terminal within the response time limit, it will clear the corresponding audio data packets from the cache memory, otherwise re-send the cached audio data packets;
S5. After receiving the audio data packets, the mobile terminal decodes and stores them, and sends confirmation signals within the response time limit, meanwhile translates and displays the decoded audio data.

Preferably, the smart headset splits audio data into two channels, including:
The smart headset reduces audio noise via a digital signal processor, and splits the audio data into two separate data streams through the splitting module of the digital signal processor.

Preferably, the other channel of audio data is sent to the mobile terminal after being compressed and packaged, including:
The digital signal processor of the smart headset converts 4-byte audio data from the other channel of audio data into 2-byte audio data, and compresses the audio data into audio data packets according to ITU-T G722.

Preferably, the mobile terminal translates and displays the decoded audio data according to the order in which the smart headset sends the audio data packets.

Preferably, when the mobile terminal receives external audio data or a command from a user to start recording, it sends an instruction to the smart headset to start the recording.

When the mobile terminal does not receive external audio data within a period of time, or receives a command from a user to stop recording, it sends an instruction to the smart headset to stop the recording.

Preferably, when the mobile terminal receives a call request and the smart headset is in a dialing state, the mobile terminal sends an instruction to the smart headset to pause the recording.

When the mobile terminal does not receive a call request and the smart headset is not in a dialing state, the mobile terminal sends an instruction to the smart headset to continue the recording.

Preferably, the smart headset establishes communication with the mobile terminal via the BLE module.

(iii) Beneficial Effects

The present invention provides a method for audio recording and conversion of smart headset. Compared with the prior art, it can clearly record one-way audio by splitting audio data at the smart headset, effectively improve the integrity of audio data received by the mobile terminal and the real-time translation of audio data into text by the mobile terminal by setting the response time limit during the process when the smart headset transmits audio data packets to the mobile terminal.

BRIEF DESCRIPTION OF THE DRAWINGS

For a better description of the embodiment of the present invention or technical scheme in the prior art, the accompanying drawing provided in the embodiment or description of the prior art will be briefly described below. It is obvious that the drawing in the description below only presents some embodiments of the present invention. Those of ordinary skill in the art are able to obtain other drawings without creative work based on the drawing.

FIG. 1 illustrates the flow of audio recording and conversion into text by smart headset in the present invention.

DETAILED DESCRIPTION

For better understanding of the purpose, technical scheme, and advantages of the embodiment of the present invention, the technical scheme provided in the embodiment of the present invention will be clearly and completely described below with reference to the accompanying drawing in the embodiment of the present invention. Obviously, the embodiment described herein represents a part rather than all embodiments of the present invention. Based on the embodiment of the present invention, all other embodiments obtained by persons of ordinary skill in the art without creative work shall fall within the scope of protection of the present invention.

A method for audio recording and conversion of smart headset, as shown in FIG. 1, the smart headset establishes communication with the mobile terminal, and the mobile terminal sends an instruction to the smart headset to start recording.

When the mobile terminal receives external audio data or a command from a user to start recording, it sends an instruction to the smart headset to start the recording. When the mobile terminal does not receive external audio data within a period of time, or receives a command from a user to stop recording, it sends an instruction to the smart headset to stop the recording.

The command from a user to start recording has a higher priority than the receiving of external audio data by the mobile terminal, and the command of a user to stop recording has a higher priority than the non-receiving of external audio data by the mobile terminal within a period of time. In the technical scheme of the present invention, the user can make a setting that an instruction is sent to the smart headset to stop recording when the mobile terminal does not receive external audio data within 30 s.

When the mobile terminal receives a call request or the smart headset is in a dialing state, the mobile terminal sends an instruction to the smart headset to pause the recording. When the mobile terminal does not receive a call request and the smart headset is not in a dialing state, the mobile terminal sends an instruction to the smart headset to continue the recording.

In the technical scheme of the present invention, after a communication is established between the mobile terminal and the smart headset, the mobile terminal interacts with the smart headset at multiple levels, and the smart headset also feeds back various information (successfully or unsuccessfully) received from the mobile terminal to the mobile terminal to ensure all information interaction are correct.

In the technical scheme of the present invention, the smart headset establishes communication with the mobile terminal via the Bluetooth low energy (BLE) module. Due to a large amount of data to be transmitted, the transmission rate is required to be very high. However, the increase of transmission rate improves the power consumption of devices, so the demand for reducing the power consumption of smart headsets is also high. The establishment of communication via the BLE module not only increases data transmission rate, but also reduces power consumption during data transmission, and more importantly, the transmission has high reliability and security. During use, the BLE module can quickly start and connect instantly, which can enhance the experience effect and meet user needs timely in application scenarios.

The smart headset splits audio data into two channels, wherein one is sent to the SPEAK of the smart headset and played, the other is sent to the mobile terminal after being compressed and packaged.

The smart headset splits audio data into two channels, including:

The smart headset reduces audio noise via a digital signal processor, and splits the audio data into two separate data streams through the splitting module of the digital signal processor.

The split data streams maintain the original data input, which ensures the audio data transmitted to the SPEAK end is consistent with that sent to the mobile terminal.

In order to ensure the rate and effectiveness of data transmission, the audio data sent to the mobile terminal is compressed with efficient audio compression algorithms, including:

The digital signal processor of the smart headset converts 4-byte audio data from the other channel of audio data into 2-byte audio data, and compresses the audio data into audio data packets according to ITU-T G722.

The smart headset uses its cache memory to cache the audio data packets, and determines whether it has received the confirmation signal from the mobile terminal within the response time limit;

If the smart headset has received the confirmation signals from the mobile terminal within the response time limit, it will clear the corresponding audio data packets from the cache memory, otherwise re-send the cached audio data packets.

As data transmission is interfered with by other wireless devices, a retransmission mechanism is adopted to avoid loss of audio data packets. After the smart headset sends audio data packets to the mobile terminal, it confirms whether the data is successfully received by receiving confirmation signals from the mobile terminal or not.

Due to a large amount of data to be transmitted, the confirmation of each audio data packet according to confirmation signals followed by transmission of the next set of data will cause transmission delay or even congestion. Therefore, a sliding window is added to the retransmission mechanism, i.e. a cache memory is added to the smart headset to save audio data packets sent previously. When each confirmation signal sent by the mobile terminal is received on time without delay, the audio data packets are received normally before cache data is cleared, which can ensure the real-time performance of data transmission and avoid loss of audio data packets.

After receiving the audio data packets, the mobile terminal decodes and stores them, and sends confirmation signals within the response time limit, meanwhile translates and displays the decoded audio data.

The mobile terminal translates and displays the decoded audio data in the order in which the smart headset sends the audio data packets to ensure that the data is translated in the same order as that in which audio data is received.

It should be noted that, if there is a delay in the transmission of an audio data packet, the mobile terminal will continue to translate the audio data packets after the audio data packet, but will not display them until the delayed audio data packet is translated and added to the translated text.

The above embodiment only serves as a description of the technical scheme of the present invention, and is not construed as limited to the present invention. While the present invention has been described in detail with reference to the foregoing embodiment, it should be understood by those of ordinary skill in the art that they can still modify the technical scheme provided in the foregoing embodiment, or make equivalent replacement of some technical features included therein. Such modifications or replacements will not cause the corresponding technical scheme to intrinsically deviate from the spirit and scope of the technical scheme provided in the embodiment of the present invention.

What is claimed is:

1. A method for audio recording and conversion of a smart headset, comprising the following steps:
    S1. establishing, by the smart headset, communication with a mobile terminal, and sending, by the mobile terminal, an instruction to the smart headset to start recording;
    S2. splitting, by the smart headset, audio data into two channels, wherein one of the two channels is sent to a SPEAK end of the smart headset and played, and another one of the two channels is sent to the mobile terminal after being compressed and packaged;
    S3. using, by the smart headset, cache memory of the smart headset to cache the packaged audio data, and determining whether the smart headset has received confirmation signals from the mobile terminal within a response time limit;
    S4. if the smart headset has received the confirmation signals from the mobile terminal within the response time limit, clearing, by the smart headset, corresponding packaged audio data from the cache memory, otherwise re-sending the cached audio data; and
    S5. after receiving the audio data, decoding and storing the audio data by the mobile terminal, sending the confirmation signals within the response time limit, and translating and displaying the decoded audio data.

2. The method for audio recording and conversion of smart headset according to claim 1, wherein splitting the audio data into the two channels comprises:
    reducing audio noise via a digital signal processor by the smart headset, and splitting the audio data into two separate data streams through a splitting module of the digital signal processor.

3. The method for audio recording and conversion of smart headset according to claim 2, wherein compressing and packaging the another one of the two channels comprises:
    converting, by the digital signal processor of the smart headset, 4-byte audio data from the another one of the two channels of the audio data into 2-byte audio data, and compressing the audio data into audio data packets according to ITU-T G722.

4. The method for audio recording and conversion of smart headset according to claim 1, wherein the mobile terminal translates and displays the decoded audio data in an order in which the smart headset sends the packaged audio data.

5. The method for audio recording and conversion of smart headset according to claim 1, wherein when the mobile terminal receives external audio data or a command from a user to start recording, the mobile terminal sends the instruction to the smart headset to start the recording, and
    when the mobile terminal does not receive the external audio data within a period of time or receives a command from the user to stop recording, the mobile terminal sends an instruction to the smart headset to stop the recording.

6. The method for audio recording and conversion of smart headset according to claim 1, wherein when the mobile terminal receives a call request or the smart headset is in a dialing state, the mobile terminal sends an instruction to the smart headset to pause the recording, and
    when the mobile terminal does not receive the call request and the smart headset is not in the dialing state, the mobile terminal sends an instruction to the smart headset to continue the recording.

7. The method for audio recording and conversion of smart headset according to claim 1, wherein the smart headset establishes communication with the mobile terminal via a Bluetooth low energy (BLE) module.

* * * * *